United States Patent
Bono et al.

(10) Patent No.: US 9,880,928 B1
(45) Date of Patent: Jan. 30, 2018

(54) STORING COMPRESSED AND UNCOMPRESSED DATA IN BLOCKS HAVING DIFFERENT ALLOCATION UNIT SIZES

(71) Applicant: EMC Corporation, Hopkinton, MA (US)

(72) Inventors: Jean-Pierre Bono, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 425 days.

(21) Appl. No.: 14/497,814

(22) Filed: Sep. 26, 2014

(51) Int. Cl.
*G06F 12/00* (2006.01)
*G06F 12/02* (2006.01)

(52) U.S. Cl.
CPC .. *G06F 12/0246* (2013.01); *G06F 2212/2228* (2013.01); *G06F 2212/7202* (2013.01); *G06F 2212/7207* (2013.01)

(58) Field of Classification Search
CPC .................................................. G06F 3/0608
USPC .................................................. 711/170, 171
See application file for complete search history.

(56) References Cited

U.S. PATENT DOCUMENTS

| | | | | |
|---|---|---|---|---|
| 5,237,460 | A * | 8/1993 | Miller | G06F 3/0601 360/48 |
| 5,784,548 | A * | 7/1998 | Liong | G06F 1/30 711/106 |
| 7,254,685 | B1 | 8/2007 | Cardente | |
| 7,631,155 | B1 | 12/2009 | Bono et al. | |
| 7,898,442 | B1 * | 3/2011 | Sovik | H03M 7/3088 341/51 |
| 7,941,409 | B2 * | 5/2011 | Mimatsu | H03M 7/30 707/687 |
| 8,285,758 | B1 | 10/2012 | Bono et al. | |
| 9,122,712 | B1 | 9/2015 | Bono et al. | |
| 2004/0030668 | A1 | 2/2004 | Pawlowski et al. | |
| 2008/0189484 | A1 * | 8/2008 | Iida | G06F 11/1441 711/114 |
| 2009/0300084 | A1 | 12/2009 | Whitehouse | |
| 2011/0145473 | A1 * | 6/2011 | Maheshwari | G06F 12/0866 711/103 |
| 2011/0167239 | A1 | 7/2011 | Horn et al. | |

(Continued)

OTHER PUBLICATIONS

NetApp Snapshots, solarisbackupandstorage, Sep. 2011. https://solarisbackupandstorage.wordpress.com/2011/09/16/netapp-snapshots/.*

*Primary Examiner* — Adam M Queler
*Assistant Examiner* — Edmund Kwong
(74) *Attorney, Agent, or Firm* — BainwoodHuang

(57) ABSTRACT

Improved techniques for storing data involve storing compressed data in blocks of a first AU size and storing uncompressed data in blocks of a second AU size larger than the first AU size. For example, when a storage processor compresses a chunk of data, the storage processor checks whether the compressed chunk fits in the smaller AU size. If the compressed chunk fits, then the storage processor stores a compressed chunk in a block having the smaller AU size. Otherwise, the storage processor stores the uncompressed chunk in a block having the larger AU size. Advantageously, the improved techniques promote better disk and cache utilization, which improves performance without disrupting block mapping.

20 Claims, 11 Drawing Sheets

(56) References Cited

U.S. PATENT DOCUMENTS

| | | | |
|---|---|---|---|
| 2013/0205071 A1* | 8/2013 | Vasudevan | G06F 3/0608 711/103 |
| 2014/0188819 A1* | 7/2014 | Bagal | G06F 17/30144 707/692 |

* cited by examiner

STORING COMPRESSED AND UNCOMPRESSED DATA IN BLOCKS HAVING DIFFERENT ALLOCATION UNIT SIZES

BACKGROUND

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Some data storage systems employ compression technology to better utilize storage resources on the non-volatile storage devices. For example, a data storage system may operate in the background to compress data stored in the non-volatile storage devices. Compression enables the data storage system to store more data in the same amount of non-volatile storage.

SUMMARY

Conventional data storage systems generally provide blocks of storage in a single allocation unit (AU) size, such as 8 KB. Unfortunately, storing compressed data in uniformly-sized blocks offers little benefit over storing uncompressed data as data storage systems generally read and write data on a block-by-block basis. It may be possible to consolidate multiple blocks' worth of compressed data into fewer numbers of blocks, but this is disruptive to block mapping, such a mapping provided in inode pointers and indirect block trees.

In contrast with the above-described conventional approach to compression, which either offers little benefit over storing uncompressed data or is disruptive to mapping, improved techniques for storing data involve storing compressed data in blocks of a first AU size and storing uncompressed data in blocks of a second AU size larger than the first AU size. For example, when a storage processor compresses a chunk of data, the storage processor checks whether the compressed chunk fits in the smaller AU size. If the compressed chunk fits, then the storage processor stores a compressed chunk in a block having the smaller AU size. Otherwise, the storage processor stores the uncompressed chunk in a block having the larger AU size. Advantageously, the improved techniques promote better disk and cache utilization, which improves performance without disrupting block mapping.

One embodiment is directed to a method of processing write requests in a data storage system. The method includes receiving write requests from a set of hosts, the write requests specifying data to be written to non-volatile storage. The method also includes storing a first portion of the data in compressed form in blocks of non-volatile storage having a first allocation unit size. The method further includes storing a second portion of the data in uncompressed form in blocks of non-volatile storage having a second allocation unit size, the second allocation unit size being larger than the first allocation unit size.

Additionally, some embodiments are directed to a system constructed and arranged to process write requests in a data storage system. The system includes memory and a controller including controlling circuitry constructed and arranged to carry out a method of processing write requests in a data storage system.

Further, some embodiments are directed to a computer program product having a non-transitory computer readable storage medium that stores instructions which, when executed by a computer, cause the computer to carry out the method of processing write requests in a data storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques for storing data in a data storage system involve storing compressed data in blocks of a first AU size and uncompressed data in blocks of a second AU size larger than the first AU size. Advantageously, the improved techniques promote better disk and cache utilization, which improves performance without disrupting block mapping.

Figure 1:
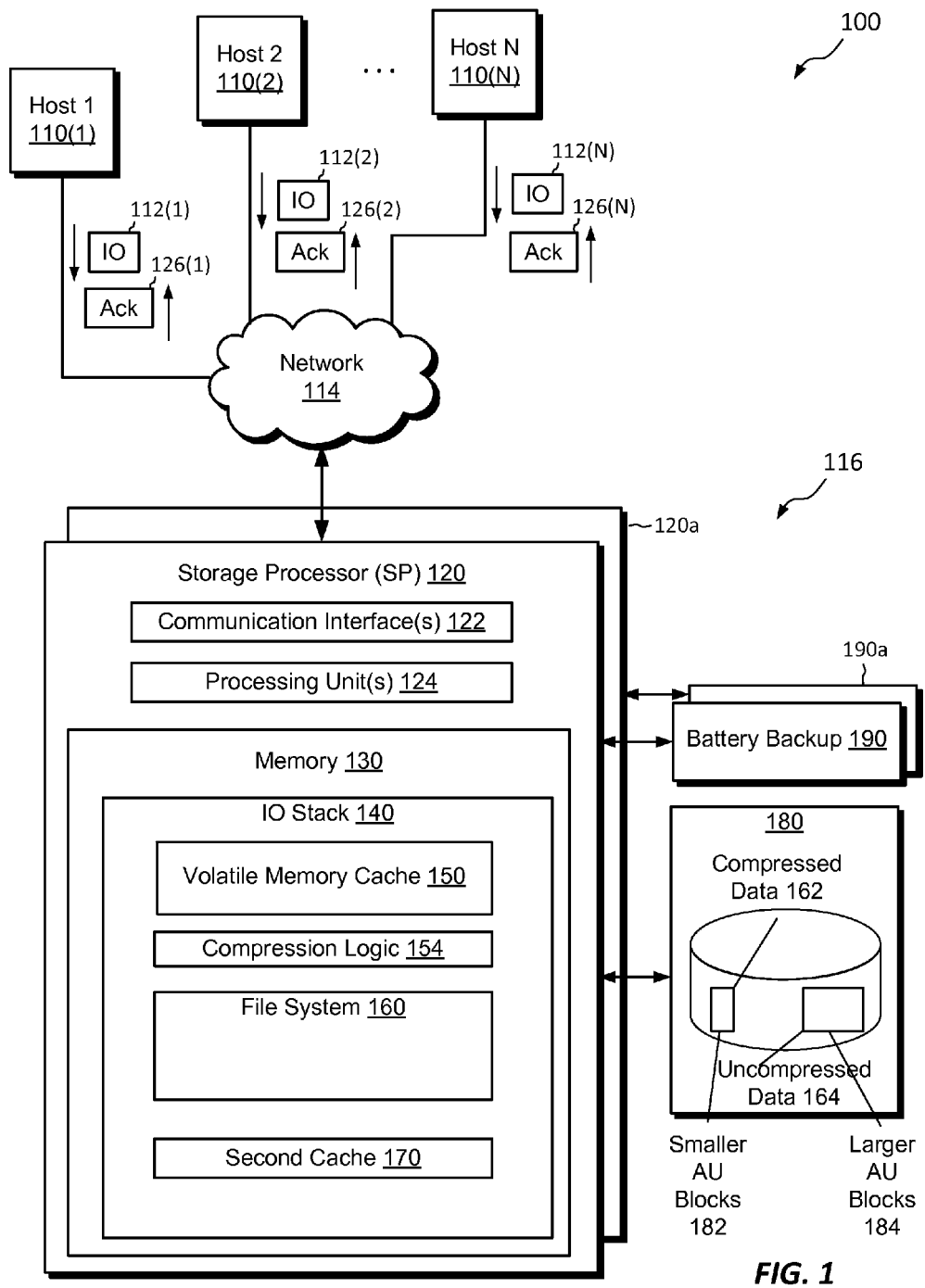
FIG. 1 is a block diagram illustrating an example electronic environment in which the improved technique can be carried out.

FIG. 1 shows an example electronic environment 100 in which embodiments of the improved techniques hereof can be practiced. Here, multiple host computing devices ("hosts") 110(1) through 110(N) access a data storage apparatus 116 over a network 114. The data storage apparatus 116 includes a storage processor, or "SP," 120 and non-volatile storage 180. The storage 180 is provided, for example, in the form of hard disk drives and/or electronic flash drives. The data storage apparatus 116 may include multiple SPs like the SP 120. For instance, the data storage system 116 may include a second SP 120*a*. In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 114 can be any type of network or combination of networks, such as a storage area network (SAN), local area network (LAN), wide area network (WAN), the Internet, and/or some other type of network, for example. In an example, the hosts 110(1-N) can connect to the SP 120 using various technologies, such as Fibre Channel (e.g., through a SAN), iSCSI, NFS, SMB 3.0, and CIFS. Any number of hosts 110(1-N) may be provided, using any of the above protocols, some subset thereof, or other protocols besides those shown. The SP 120 is configured to receive IO requests 112(1-N) and to respond to such IO requests 112(1-N) by reading and/or writing the non-volatile storage 180.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., realize by operation of programming code) an IO stack 140. The IO stack 140 provides an execution path for host IOs (e.g., IO requests 112(1-N)). The IO stack 140, inter alia, a volatile memory cache 150, compression logic 154, a file system 160, and a second cache 170. The underlying data and metadata that support the file system 160 typically reside in the storage 180.

Portions of the memory 130 that support the volatile memory cache 150 may be realized in volatile memory, e.g., DRAM, within SP 120. In an example, the SP 120*a* has a similar volatile memory cache 150 that is configured to mirror data stored in the DRAM of the SP 120.

The data storage apparatus 116 is also seen to include battery backup 190 and 190*a* connected to respective SPs 120 and 120*a*, for powering their respective DRAMs in case of an unexpected loss of power. Hence, the battery backups 190 and 190*a* make it possible for data in the volatile memory cache 150 to be deemed persisted even though it may only be stored in volatile memory. Such persistence allows the SP 120 to send acknowledgments 126(1 . . . N) to respective hosts 110(1 . . . N) as soon as data from IO requests 112(1 . . . N) are written to the volatile memory cache 150 and mirrored to the SP 120*a*. Such rapid acknowledgments to the IO requests 112(1 . . . N) helps in maintaining a high quality of service for the hosts 110(1 . . . N).

Compression logic 154 includes instructions to cause one or more of the processing units 124 to compress data residing in the volatile memory cache 150.

In an example, the file system 160 is a container file system storing a container file representing a data object, such as a host file system (HFS), a virtual volume (vVol), or a LUN. The SP 120 may host any number of such container file systems. Each such container file system includes a respective inode table. The inode table includes inodes providing file-specific information about each file in the respective container file system. The information stored in each inode includes location information (e.g., block locations) where data of the respective file are stored. It should be understood that any container file system might contain multiple files, with each having its own entry in the respective inode table. In some arrangements, each container file system stores not only a file representing a data object, but also snaps of that file and therefore snaps of the data object the file stores.

It should further be understood that a container file system may be allocated storage from a storage pool in the form of "slices." A "slice" is an increment of storage space, such as 256 MB or 1 GB in size, which is derived from the non-volatile storage 180. The pool may allocate slices to a container file system, e.g., file system 160, for use in storing its files. The pool may also deallocate slices from the container file system if the storage provided by the slices is no longer required. In an example, the storage pool creates slices by accessing RAID groups, dividing the RAID groups into FLUs (Flare LUNS), and further dividing the FLUs into slices.

The file system 160 supports storage of compressed data 162 and uncompressed data 164 within the non-volatile storage 180 in blocks having different allocation unit (AU) sizes. As illustrated in FIG. 1, the file system 160 supports blocks 182 of smaller AU size, e.g., 8 KB, for storing the compressed data 162, and blocks 184 of larger AU size, e.g., 32 KB, for string the uncompressed data 164.

In some arrangements, the data storage system 116 arranges blocks in different slices according to AU size. By keeping blocks 182 of smaller AU size and blocks 184 of larger AU size in separate slices, problems stemming from defragmentation may be avoided.

The secondary cache 170 provides data caching for the storage 180. It may be implemented within volatile memory within the memory 130.

During operation, SP 120 receives IO requests 112 from hosts 110 over the network 114. When the IO requests 112 are write requests, SP 120 stores data specified by the write requests in the volatile memory cache 150.

In some arrangements, SP 120 mirrors the data from the write requests into a volatile memory cache 150 within SP 120*a*. When SPs 120 and 120*a* have battery backup (190 and 190*a*) for their volatile memory cache 150, the SP 120 may send acknowledgments 126(1), 126(2), . . . , 126(N) of the write requests to respective hosts because the data may be deemed persisted once it has been cached and mirrored.

The SP 120 executes compression logic 154 to compress data specified in write requests. In some arrangements, the SP 120 compresses the data in an inline manner prior to the data being written to the non-volatile storage 180. The data may be stored in compressed form and/or uncompressed form, depending on whether the data in compressed form fits in blocks 182 of the smaller AU size. The SP 120 may also compress data in a background manner after storing data in non-volatile storage 180, for example, in situations in which it is not feasible to perform compression in-line.

Figure 2:
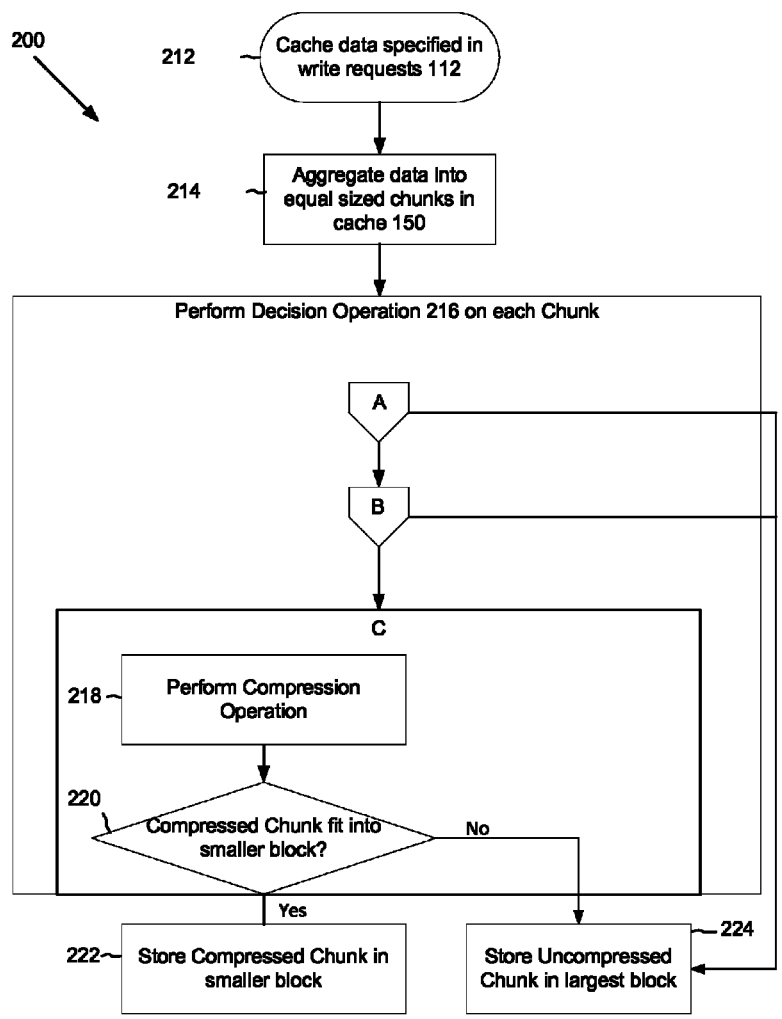
FIG. 2 is a flow chart illustrating an example decision operation carried out within the electronic environment shown in FIG. 1.

FIG. 2 shows an example method 200 of deciding which of data specified in write requests the SP 120 stores as compressed data, and which of the data the SP 120 stores as uncompressed data.

At 212, the SP 120 caches data specified by the write requests in the volatile memory cache 150, as described above in connection with FIG. 1.

At 214, the SP 120 aggregates the data into chunks in the volatile memory cache 150. In an example, the chunks have a data size equal to the AU size of the larger blocks 184.

SP 120 then performs a decision operation 216 to decide whether to store the chunks in compressed or uncompressed form. Decision operation 216 includes sub-processes "A", "B", and "C". "A" and "B" are optional processes but each may terminate the decision process prior to initiating process "C". Sub-processes "A" and "B" will be discussed in connection with FIGS. 4A, 4B, and 4C.

SP 120 carries out process "C" to determine whether a compression operation sufficiently compresses a chunk so that the resulting compressed chunk fits in a smaller block 182. At 218, SP 120 performs a trial compression operation on a chunk of data stored in the volatile memory cache 150. The particular approach used to achieve compression may be any type of compression algorithm and will not be described further. At 220, the SP 120 tests whether the resulting compressed chunk of data fits in a block of storage 182 having the smaller AU size.

If the compressed chunk does fit in the block 182 having the smaller AU size, then, at 222, SP 120 stores the compressed chunk within the block 182 having the smaller AU size. If not, then, at 224, SP 120 stores the uncompressed chunk within the block 184 having the larger AU size.

Figure 3:
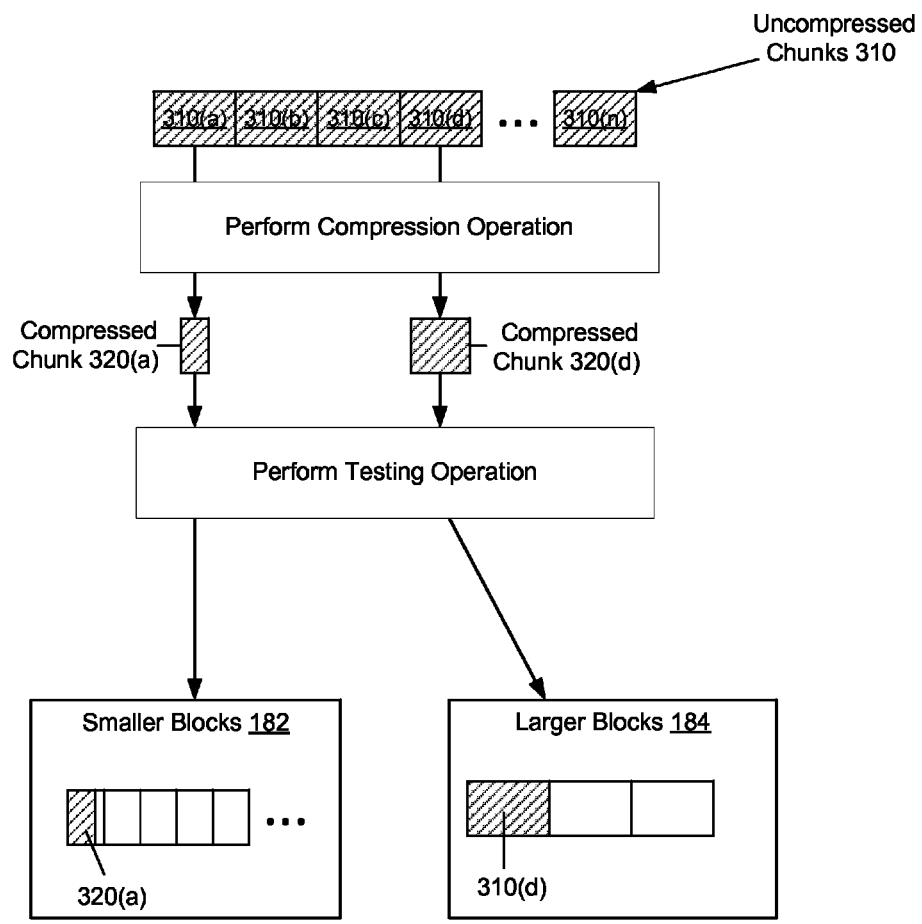
FIG. 3 is a block diagram illustrating example compression and testing operations within the electronic environment shown in FIG. 1.

FIG. 3 illustrates a further example of the above-described process "C". Process "C" begins with chunks 310(*a*), 310 (*b*), 310 (*c*), 310 (*d*), . . . , 310 (*n*) (chunks 310), which reside within the volatile memory cache 150. Each of the chunks 310 has a data size equal to the larger AU size, e.g., 32 KB.

In this example, the compression logic 154 performs a compression operation on each of the chunks 310. It should be understood that, while the sizes of each chunk 310 may be the same, the size of the resulting compressed chunks are likely to be different, as the size of a compressed chunk depends on the content of its data, as well as other factors. Compression of, for example, chunks 310(*a*) and 310(*d*) results in respective compressed chunks 320(*a*) and 320(*d*).

Compressed chunks 320(*a*) and 320(*d*) each undergo a testing operation (e.g., at 220 of FIG. 2) in which their sizes are compared with the smaller AU size. In this specific instance, compressed chunk 320(*a*) fits within the smaller AU size, while compressed chunk 320(*d*) does not fit within the smaller AU size. This is the case even though the data size of compressed chunk 320(*d*) may be substantially smaller than that of its respective uncompressed chunk 310(*d*). Thus, in this specific example, SP 120 stores the compressed chunk 320(*a*) in a smaller AU block 182, while SP 120 stores the uncompressed chunk 310(*d*) in a larger AU block 184.

It should be understood that the decision operation 216 (see FIG. 2) might include other processes, which may involve evaluating conditions within the data storage system 116 to decide whether a compression operation should even be attempted.

Figure 4A:
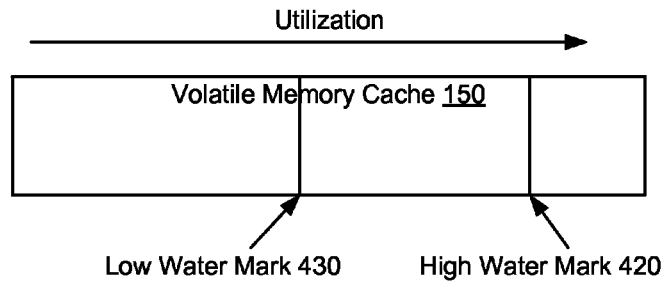
FIG. 4A is a block diagram illustrating an example cache within the electronic environment shown in FIG. 1.

FIG. 4A shows the volatile memory cache 150, which is seen to have a high water mark 420 and low water mark 430.

The high water mark 420 is defined as a high level of utilization of the volatile memory cache 150, e.g., 80%. Above the high water mark 420, the SP 120 will cease performing trial compression operations, as the volatile memory cache 150 is at risk of being overrun and continuing trial compression may slow down acknowledgments to the hosts 110. The low water mark 430 is defined as a level of utilization sufficiently below the high water mark 430 at which the SP 120 will resume trial compression operations after the level of utilization has already exceeded the high water mark 420. Typically, the low water mark 430 is 20% below the high water mark 420, but other values for the low water mark 430 may be used. The difference between the high water mark and the low water mark prevents cluttering around a single threshold.

Figure 4B:
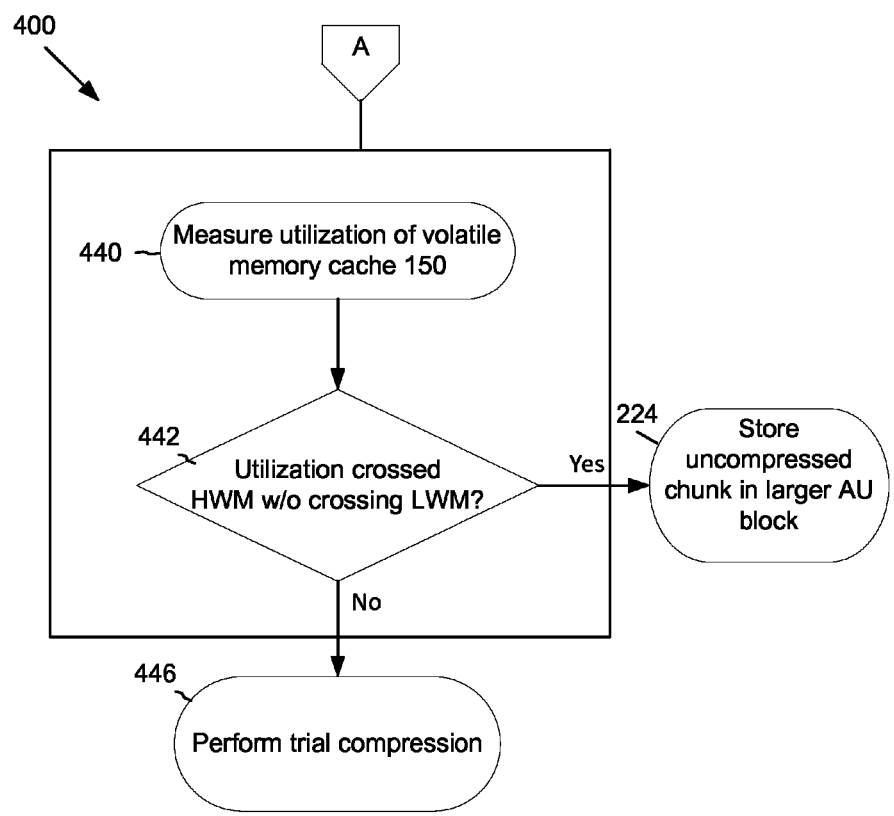
FIG. 4B is a flow chart illustrating another aspect of the example decision operation of FIG. 3.

FIG. 4B illustrates an example method 400 of carrying out process "A" to determine, from the utilization of the volatile memory cache 150, whether to carry out a trial compression operation on a current chunk of data.

At 440, the SP 120 measures the utilization of the volatile memory cache 150, e.g., using any known method. At 442, the SP 120 compares the utilization of the volatile memory cache 150 to the high water mark 420. If the utilization exceeds the high water mark, or has exceeded the high water mark 420 and has not subsequently crossed the low water mark 430, then the SP 120 stops performing trial compression operations until the utilization falls below the low water mark 430. Until then, the SP 120 stores the uncompressed, current chunk in a block 184 having the larger AU size in the non-volatile storage 180 (at 224 as described above), and the method 400 is complete. Otherwise, at 446, the SP 120 may begin a compression operation on the current chunk.

Figure 4C:
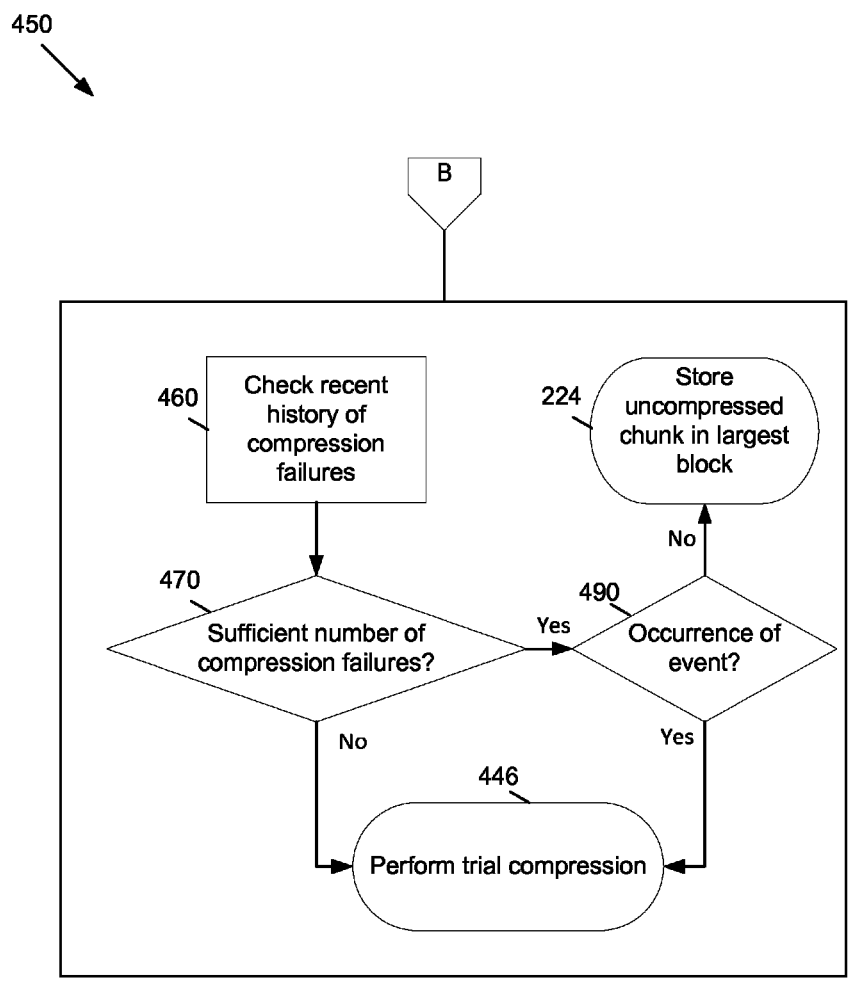
FIG. 4C is a flow chart illustrating yet another aspect of the example decision operation of FIG. 3.

FIG. 4C illustrates an example method 450 of carrying out process "B" to determine, based on a recent history of compression failures, whether to carry out a trial compression operation on the current chunk.

At 460, the SP 120 checks a recent history of compression failures to determine a pattern of compression failures out of a total number of compression attempts. The recent history may be taken over a time scale of milliseconds or seconds, although longer and shorter time scales might be used. In some arrangements, checking the recent history may involve computing a simple percentage of compression failures, computing a weighted distribution of the compression failures over time, or other techniques. The SP 120 may store the recent history in the memory 130.

It should be understood that a "compression failure" as used above does not imply a failure of the compression operation, per se, but rather a failure to produce a compressed chunk that fits in a block 182 having the smaller AU size.

At 470, the SP 120 determines whether a pattern (e.g., calculated percentage or distribution) of compression failures in the recent history exceeds a predetermined threshold. If so, then the SP 120, at 224 as described above, stores the current, uncompressed chunk in a block 184 of larger AU size in the non-volatile storage 180. The method 450 for the current chunk is then complete. Otherwise, the SP 120 begins a compression operation in process "C", as described above, at 446.

If there is no such pattern of compression failures, then at 490, the SP 120 determines whether a predetermined event has occurred that would trigger a resumption of compression operations. In some arrangements, the passage of a specified amount of time since trial compression operations were stopped serves as such an event. For example, trial compressions are stopped if there has been a recent history of compression failures, but they are resumed after a specified amount of time. In other arrangements, the receipt of write requests from a new application serves as such an event. If the SP 120 detects such a predetermined event, then the SP 120 proceeds to process "C" at 495. Otherwise, the SP 120, at 480, stores the current, uncompressed chunk in a block 184 of larger AU size in the non-volatile storage 180.

Figure 5A:
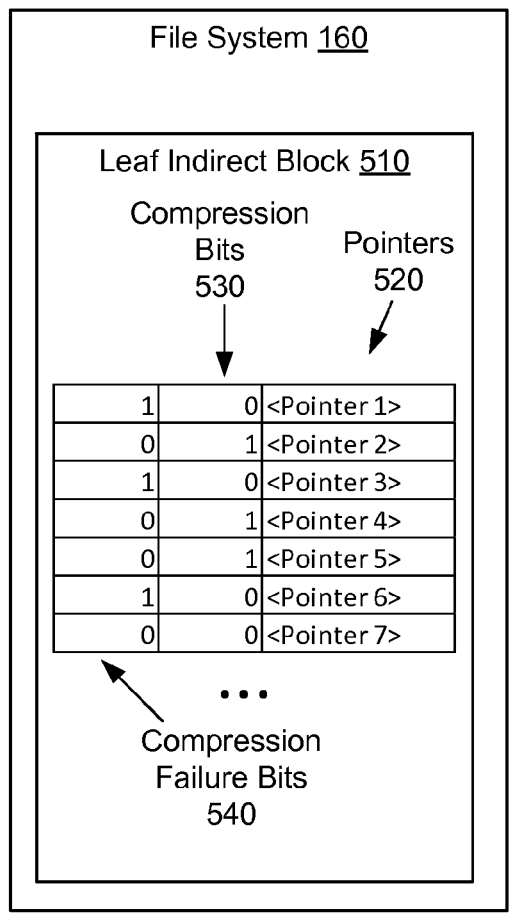
FIG. 5A is a block diagram illustrating an example leaf indirect block of a file system.

FIG. 5A illustrates an example leaf indirect block 510 of the file system 160. It should be understood that when the file system 160 is a container file system with a single file having an inode, the inode contains pointers to indirect blocks, which in turn point to other indirect blocks and/or to data blocks. The leaf indirect block 510 of such a container file system is a leaf node of an indirect block tree referenced in the inode and contains pointers 520 to data blocks stored within the non-volatile storage 180. It should be understood that some of these pointers 520 point to blocks 182 having the smaller AU size and containing data in compressed form, whereas others of these pointers 520 point to blocks 184 having the larger AU size and containing data in uncompressed form.

In some examples, the leaf indirect block 510 also contains corresponding compression bits 530 and compression failure bits 540, one of each bit for each pointer 520. In an example, each compression bit 530 takes the value "0" when its corresponding pointer points to a block 184 having the larger AU size containing data in uncompressed form and the value "1" when its corresponding pointer points to a block 182 having the smaller AU size containing data in compressed form. The SP 120 uses a compression bit 530 to quickly determine whether the data being pointed to is compressed or not. The value of the compression failure bit 540 is meaningful only when its corresponding pointer 520 has a compression bit value of "0". In an example, each compression failure bit 540 takes the value "1" when a compression operation on the pointed-to data was attempted and failed. The bit 540 may be set to "0" when there was no such compression operation attempted, e.g., when the utilization of the volatile memory cache 150 was above the high water mark. The usefulness of a compression failure bit 540 is that it allows the SP 120 to determine whether it might still be possible to compress the pointed-to, uncompressed data. When no attempt at compression of that data has been made, then the SP 120 may attempt a background compression on the data.

Figure 5B:
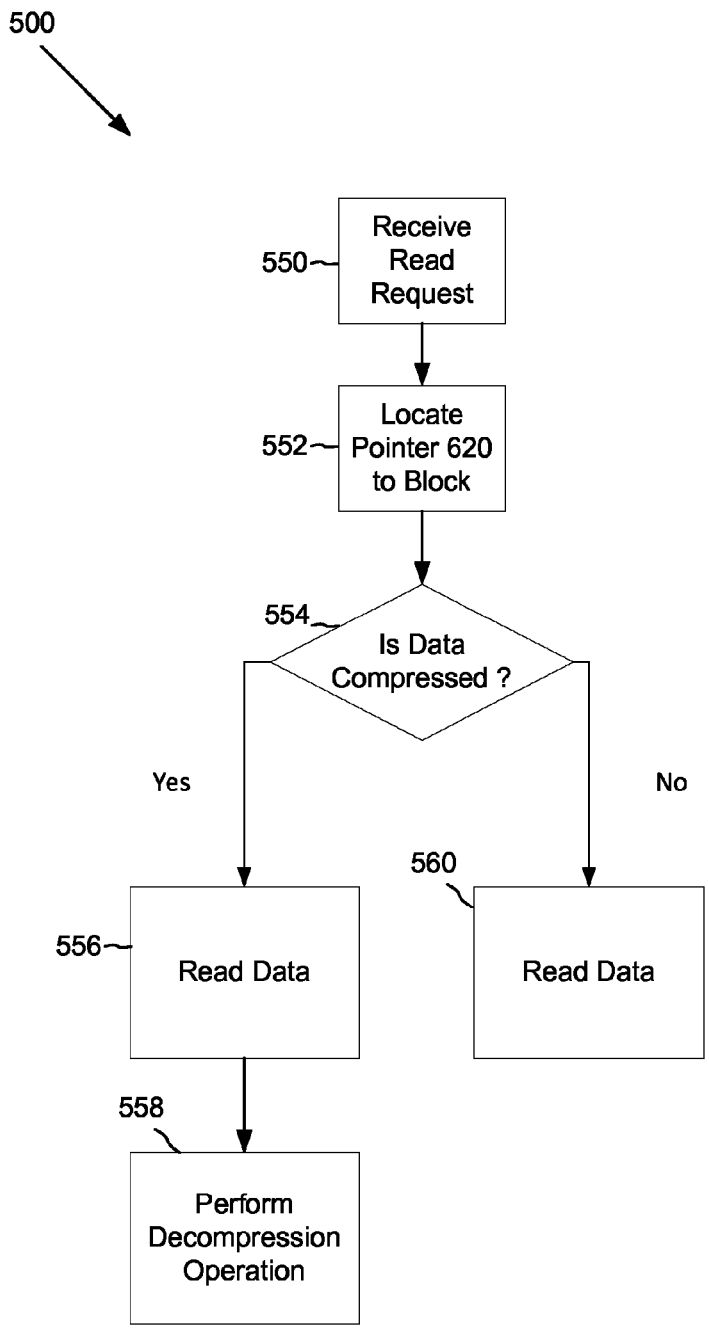
FIG. 5B is a flow chart illustrating an example read operation involving a leaf indirect block within the electronic environment shown in FIG. 1.

FIG. 5B illustrates a method 500 of reading a block of data within the electronic environment 100. As part of the method 500, the SP 120 refers to the leaf indirect block 610 when requested to access the data in the non-volatile storage 180. At 550, the SP 120 receives a read request to read a data object stored in the file system 160. At 552, the SP 120 locates the pointer 620 to a block within the leaf indirect block 510 of a container file system containing a file realizing the data object. At 554, the SP 120 determines whether the pointer 620 points to compressed data (i.e., stored in smaller block 182) or uncompressed data (i.e., stored in larger block 184). In some arrangements, the SP 120 makes such a determination from the compression bit 630 for that pointer. If the pointer 620 points to compressed data, then the SP 120, at 556, reads the data and, at 558, decompresses the data. If, however, the pointer 620 points to uncompressed data, then, at 560, the SP 120 simply reads the data.

Figure 6:
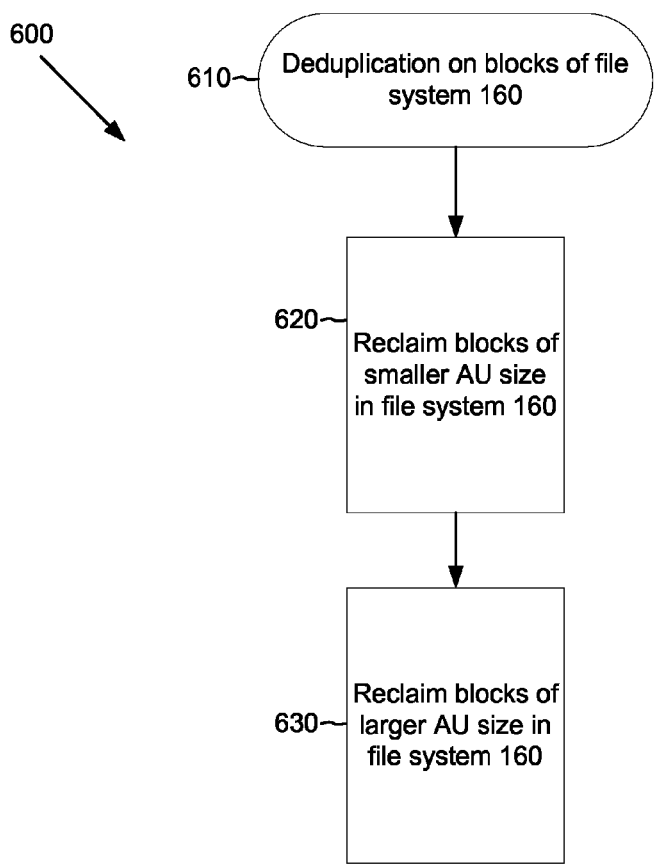
FIG. 6 is a flow chart illustrating an example deduplication operation that may be conducted in the electronic environment shown in FIG. 1.

FIG. 6 illustrates a method 600 of performing deduplication on blocks within the file system 160. At 610, the SP 120 receives a command to perform a deduplication operation on blocks of the file system 160. At 620, the SP 120 reclaims duplicate blocks 182 with the smaller AU size. In step 630, the SP 120 reclaims duplicate blocks 184 with the larger AU size. It should be understood that the duplicate blocks are replaced with pointers to remaining blocks having the same content as the reclaimed blocks, regardless of the AU size of those blocks and regardless of whether the data in those blocks is compressed or uncompressed.

Figure 7A:
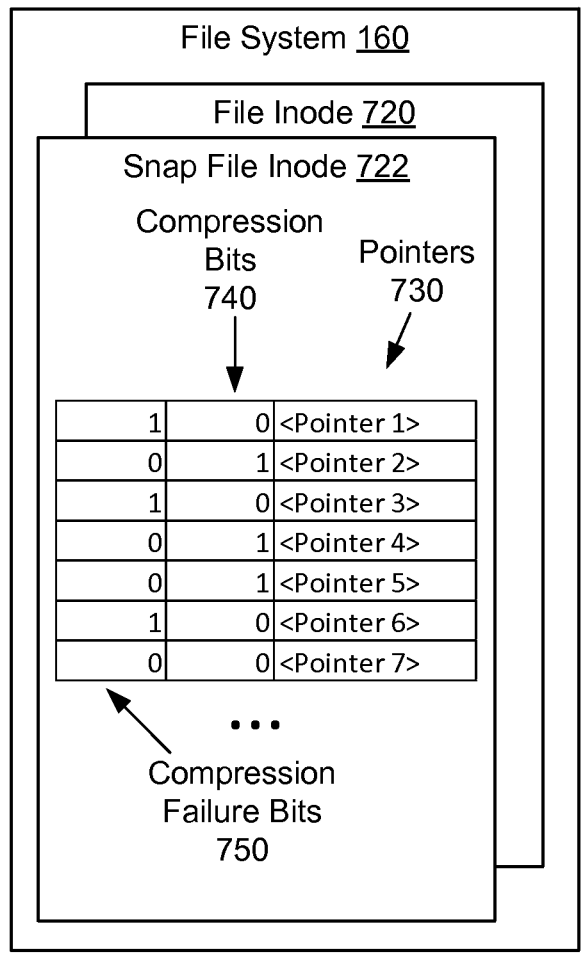
FIG. 7A is a block diagram illustrating file inodes in a file system within the electronic environment shown in FIG. 1.

FIG. 7A shows a file inode 720 and a snap file inode 722 resulting from a snapshot operation within the file system 160. The snap file inode 722 contains pointers 730 to blocks 182 of smaller AU size and blocks 184 of larger AU size in non-volatile storage 180, compression bits 740, and compression failure bits 750.

Figure 7B:
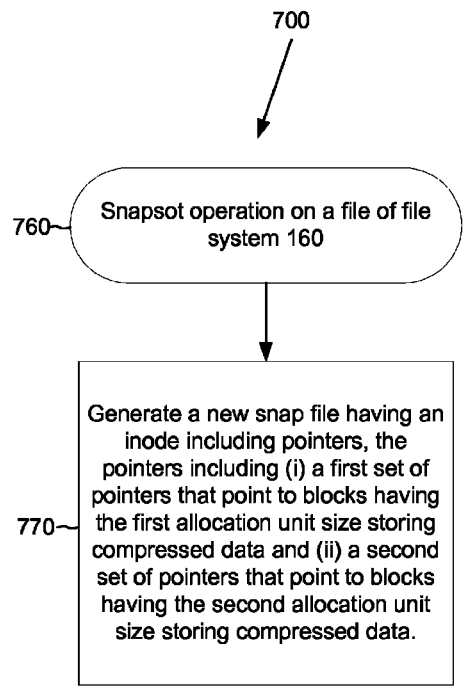
FIG. 7B is a flow chart illustrating a snapshot operation within the electronic environment shown in FIG. 1.

FIG. 7B illustrates a method 700 of performing a snapshot operation on files within the file system 160. As part of the method 700, the SP 120, at 760, performs a snapshot operation on the file having the file inode 720. In an example, the file is a container file that realizes a LUN, host file system, or vVol, for example. At 770, the SP 120 generates a new snap file having the snap file inode 722. Thus, the snapshot operation can be performed on the file without regard for the AU size of the pointed-to blocks or whether they store compressed or uncompressed data.

Figure 8:
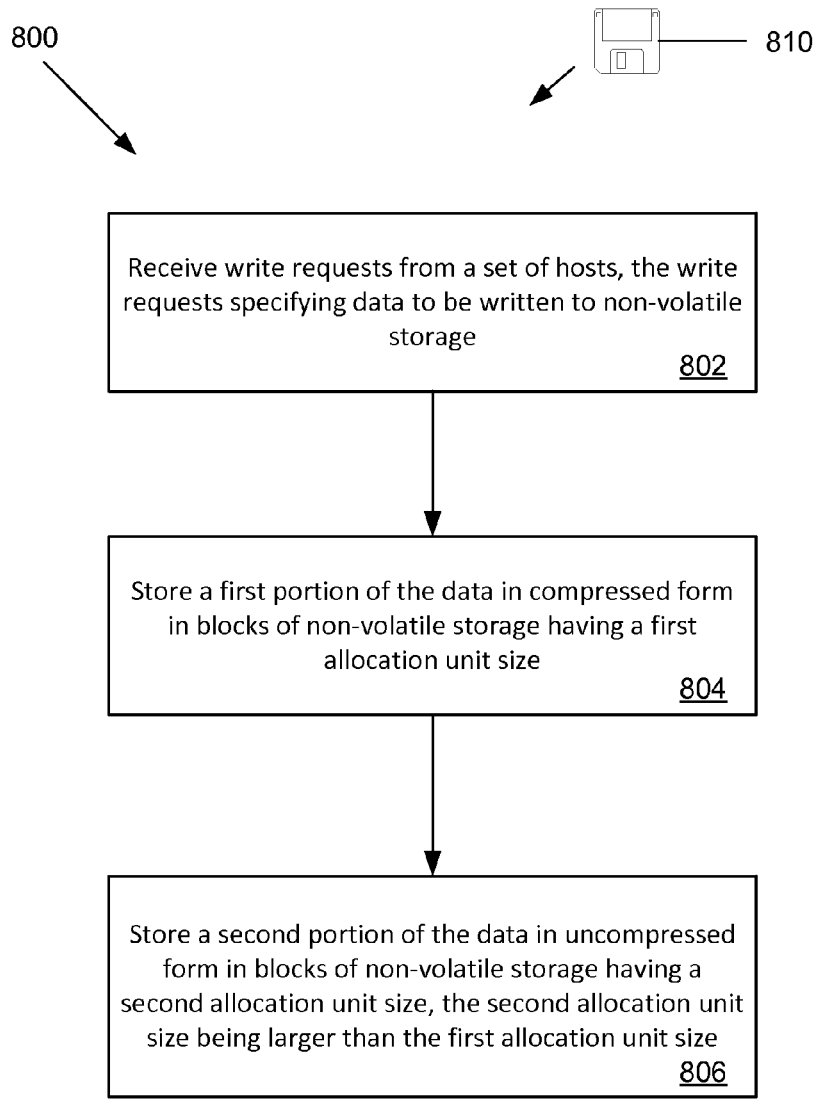
FIG. 8 is a flow chart illustrating an example method of processing the write requests within the electronic environment shown in FIG. 1.

FIG. 8 illustrates a method 800 of processing write requests in a data storage system, including steps 802, 804 and 806.

At 802, the data storage system receives write requests from a set of hosts over a network, the write requests specifying data to be written to non-volatile storage. For example, the SP 120 of the data storage system 116 receives write requests 112 over the network 114 specifying data to be written to non-volatile storage 180.

At 804, the data storage system stores a first portion of the data in compressed form in blocks of non-volatile storage having a first allocation unit size. For example, the SP 120 may compress chunks of data and store those compressed chunks that fit in the blocks 182 having smaller AU size.

At 806, the data storage system stores a second portion of the data in uncompressed form in blocks of non-volatile storage having a second allocation unit size, the second allocation unit size being larger than the first allocation unit size. For example, the SP 120 stores the uncompressed blocks in blocks 184 having the larger AU size when compression of those blocks yields compressed blocks that do not fit in the smaller AU size.

Improved techniques have been disclosed that involve a storage processor of a data storage system storing compressed data in blocks of a first AU size and uncompressed data in blocks of a second AU size larger than the first AU size. Advantageously, this allows for more effective compression while preserving block mapping in a file system.

Having described certain embodiments, numerous alternate embodiments or variations can be made. For example, while the above examples provide for two AU sizes, in some arrangements the file system may support more than two AU sizes for blocks of storage in the non-volatile storage system 180. In particular, there may be a third, intermediate AU size, e.g., 16 KB, in between a larger AU size, e.g., 32 KB, and a smaller AU size, e.g., 8 KB. In this case, the compression logic 154 would direct the SP to store those chunks that compress to a size between 8 KB and 16 KB in compressed form in a block having the AU size of 16 KB, rather than in uncompressed form in a black having the AU size of 32 KB.

Further, while the above examples are directed to inline compression, in which the compression operations are performed prior to storage in the non-volatile storage medium 180, in some arrangements the SP 120 may perform background compression operations after storage in the non-volatile storage medium 180.

Furthermore, it should be understood that some embodiments are directed to data storage apparatus 116 containing storage processor 120, which is constructed and arranged to process write requests in a data storage system. Some embodiments are directed to a process of processing write requests in a data storage system. Also, some embodiments are directed to a computer program product that enables computer logic to cause a computer to process write requests in a data storage system in a computing environment.

In some arrangements, storage processor 120 is implemented by a set of cores or other types of control/processing circuitry running software. In such arrangements, the software instructions can be delivered, within storage processor 120, either in the form of a computer program product 910, or simply instructions on disk or pre-loaded in memory 130 of data storage system 116, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

What is claimed is:

1. A method of processing write requests in a data storage system, the method comprising:
    receiving, by the data storage system over a network, write requests from a set of hosts, the write requests specifying data to be written to non-volatile storage;
    storing a first portion of the data in compressed form in blocks of non-volatile storage having a first allocation unit size; and
    storing a second portion of the data in uncompressed form in blocks of non-volatile storage having a second allocation unit size, the second allocation unit size being larger than the first allocation unit size,
    wherein a set of the blocks of the non-volatile storage store data for realizing a file system, the file system operating with a logical block size equal to the second allocation unit size; and
    wherein the method further comprises:
        receiving a request to read a block of the non-volatile storage having the first allocation unit size; and
        performing a decompression operation on compressed data stored in the block to produce an amount of uncompressed data having a size equal to the second allocation unit size,
    wherein the file system has a leaf indirect block including a set of pointers to blocks storing data of the file system,
    wherein the leaf indirect block further includes a first bit for each of the set of pointers, a value of the first bit indicating whether that pointer points to a block having the first allocation unit size, and
    wherein the leaf indirect block of the file further includes a second bit for each of the set of pointers, the value of the second bit indicating whether that pointer points to a block storing data on which a compression operation was attempted and failed.

2. A method as in claim 1, further comprising:
    upon receiving each of the write requests, caching the data specified by that write request in a volatile memory of the data storage system; and
    after caching the data, acknowledging to the set of hosts that each of the write requests was fulfilled.

3. A method as in claim 2, further comprising mirroring the data specified by each of the write requests to a second volatile memory, the volatile memory and the second volatile memory having battery backup; and
    wherein acknowledging that each write request was fulfilled occurs after the data specified by that write request are cached in the volatile memory and mirrored to the second volatile memory.

4. A method as in claim 2, further comprising, after caching the data specified by each write request in the volatile memory:
    aggregating the data specified by that write request in chunks in the cache, each of the chunks having a size equal to the second allocation unit size; and
    performing a decision operation to determine whether to store each chunk in compressed form in the blocks of the non-volatile storage having the first allocation unit size.

5. A method as in claim 4, wherein performing the decision operation includes:
    performing a compression operation on each of a set of the chunks to form respective compressed chunks; and
    for each compressed chunk resulting from the compression operation, performing a testing operation to produce a testing result indicating whether the compressed chunk fits in a block having the first allocation unit size; and
    wherein the method further comprises:
        flushing each compressed chunk that fits in a block having the first allocation unit size to a block having the first allocation unit size; and
        flushing each chunk whose respective compressed chunk does not fit in a block having the first allocation unit size to a block having the second allocation unit size.

6. A method as in claim 5, wherein performing the decision operation further includes:
    monitoring a recent history of testing results for a second set of the chunks; and
    in response to the recent history indicating that recently a sufficient number of the second set of the chunks have not been able to fit into blocks having the first allocation unit size, flushing subsequent chunks to blocks having the second allocation unit size without performing any compression operation.

7. A method as in claim 6, wherein performing the decision operation further includes:
    after the occurrence of a predetermined event, resuming the compression operation on subsequent chunks to produce respective, subsequent compressed chunks; and for each subsequent compressed chunk resulting from the compression operation, performing the testing operation to produce a testing result indicating whether the subsequent compressed chunk fits in a block having the first allocation unit size; and wherein the method further comprises:
flushing each subsequent compressed chunk that fits in a block having the first allocation unit size to a block having the first allocation unit size; and
flushing each subsequent chunk whose respective, subsequent compressed chunk does not fit in a block having the first allocation unit size to a block having the second allocation unit size.

8. A method as in claim 5, wherein the volatile memory has a high water mark indicating a high level of utilization of the volatile memory for caching data, and a low water mark below the high water mark; and
wherein performing the decision operation includes:
examining whether the high water mark of the volatile memory has been obtained;
in response to the high water mark being obtained, storing a third set of the chunks in uncompressed form in a block of the non-volatile storage having the second allocation unit size without performing any compression operation until a subsequent examination result indicates that the low water mark has been obtained;
in response to the low water mark being subsequently obtained, resuming the compression operation on subsequent chunks to produce respective, subsequent compressed chunks; and
for each subsequent compressed chunk resulting from the compression operation, performing the testing operation to produce a testing result indicating whether the subsequent compressed chunk fits in a block having the first allocation unit size; and
wherein the method further comprises:
flushing each subsequent compressed chunk that fits in a block having the first allocation unit size to a block having the first allocation unit size; and
flushing each subsequent chunk whose respective, subsequent compressed chunk does not fit in a block having the first allocation unit size to a block having the second allocation unit size.

9. A method as in claim 1,
wherein the method further comprises:
reading the value of the first bit for a pointer after receiving a request to read the block to which that pointer points;
performing the decompression operation on data stored in the block when the first bit has a first value.

10. A method as in claim 9,
wherein the method further comprises:
for each of the set of pointers pointing to a block having the second allocation unit size, reading the value of the second bit for that pointer after receiving a request to read the block to which that pointer points.

11. A method as in claim 1, wherein the method further comprises realizing one of a LUN, vVol, and HFS in the form of a file.

12. A method as in claim 1, further comprising performing a deduplication operation on a duplicate block of the file system, the deduplication operation including:
reclaiming a duplicate block having the first allocation unit size from the file system; and
reclaiming a duplicate block having the second allocation unit size from the file system.

13. A method as in claim 1, further comprising performing a snapshot operation on a file stored in the file system, the file having an inode, the snapshot operation including:
generating a new snap file having an inode including pointers, the pointers including (i) a first set of pointers that point to blocks having the first allocation unit size storing compressed data and (ii) a second set of pointers that point to blocks having the second allocation unit size storing compressed data.

14. A method as in claim 1, further comprising storing a third portion of the data in compressed form in blocks of non-volatile storage having a third allocation unit size, the third allocation unit size being larger than the first allocation unit size and smaller than the second allocation unit size.

15. A data storage system comprising:
non-volatile storage;
memory; and
controlling circuitry coupled to the memory, the controlling circuitry constructed and arranged to:
receive write requests from a set of hosts, the write requests specifying data to be written to non-volatile storage;
store a first portion of the data in compressed form in blocks of non-volatile storage having a first allocation unit size; and
store a second portion of the data in uncompressed form in blocks of non-volatile storage having a second allocation unit size, the second allocation unit size being larger than the first allocation unit size,
wherein a set of the blocks of the non-volatile storage store data for realizing a file system, the file system having a leaf indirect block including a set of pointers to blocks storing data of the file system, each of the set of pointers including:
a first bit having a value that indicates whether that pointer points to a block having the first allocation unit size, and
a second bit having a value that indicates whether that pointer points to a block storing data on which a compression operation was attempted and failed.

16. A data storage system as in claim 15, wherein the controlling circuitry is further constructed and arranged to:
upon receiving each of the write requests, cache the data specified by that write request in a volatile memory of the data storage system; and
after caching the data, acknowledge to the set of hosts that each of the write requests was fulfilled.

17. A data storage system as in claim 16, wherein the controlling circuitry is further constructed and arranged to mirror the data specified by each of the write requests to a second volatile memory, the volatile memory and the second volatile memory having battery backup; and
wherein the controlling circuitry constructed and arranged to acknowledge that the write requests were fulfilled does so after the data are cached in the volatile memory and mirrored to the second volatile memory.

18. A data storage system as in claim 16, wherein the controlling circuitry is further constructed and arranged to, after caching the data specified by the write requests in the volatile memory:
aggregate the data specified by that write request in chunks in the cache, each of the chunks having a size equal to the second allocation unit size; and
perform a decision operation to determine whether to store each chunk in compressed form in the blocks of the non-volatile storage having the first allocation unit size.

19. A computer program product comprising a non-transitory, computer-readable storage medium which stores executable code, which when executed by a storage processor of a data storage system, causes the storage processor to perform a method of processing write requests in a data storage system, the method comprising:
- receiving, by the data storage system over a network, write requests from a set of hosts, the write requests specifying data to be written to non-volatile storage;
- storing a first portion of the data in compressed form in blocks of non-volatile storage having a first allocation unit size; and
- storing a second portion of the data in uncompressed form in blocks of non-volatile storage having a second allocation unit size, the second allocation unit size being larger than the first allocation unit size,
- wherein a set of the blocks of the non-volatile storage store data for realizing a file system, the file system having a leaf indirect block including a set of pointers to blocks storing data of the file system, each of the set of pointers including:
  - a first bit having a value that indicates whether that pointer points to a block having the first allocation unit size, and
  - a second bit having a value that indicates whether that pointer points to a block storing data on which a compression operation was attempted and failed.

20. A computer program product as recited in claim 19, wherein a set of the blocks of the non-volatile storage store data for realizing a file system, the file system operating with a logical block size equal to the second allocation unit size and wherein the method further comprises:
- receiving a request to read a block of the non-volatile storage having the first allocation unit size; and
- performing a decompression operation on compressed data stored in the block to produce an amount of uncompressed data having a size equal to the second allocation unit size.

* * * * *